US012115830B2

(12) United States Patent
Matsumura et al.

(10) Patent No.: US 12,115,830 B2
(45) Date of Patent: Oct. 15, 2024

(54) SHOCK ABSORBER

(71) Applicant: Hitachi Astemo, Ltd., Ibaraki (JP)

(72) Inventors: Sadatomo Matsumura, Hitachinaka (JP); Koichi Yamaka, Hitachinaka (JP); Naoya Tokoo, Hitachinaka (JP); Yoshihiro Yamaguchi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/023,943

(22) PCT Filed: Aug. 30, 2021

(86) PCT No.: PCT/JP2021/031708
§ 371 (c)(1),
(2) Date: Feb. 28, 2023

(87) PCT Pub. No.: WO2022/050215
PCT Pub. Date: Mar. 10, 2022

(65) Prior Publication Data
US 2024/0025220 A1    Jan. 25, 2024

(30) Foreign Application Priority Data
Sep. 4, 2020    (JP) ................. 2020-148890

(51) Int. Cl.
*B60G 3/06*       (2006.01)
*B60G 13/06*      (2006.01)
*B60G 15/06*      (2006.01)
(52) U.S. Cl.
CPC .............. *B60G 3/06* (2013.01); *B60G 13/06* (2013.01); *B60G 15/063* (2013.01); *B60G 2200/142* (2013.01)

(58) Field of Classification Search
CPC ........ B60G 15/063; B60G 3/06; B60G 13/06; B60G 2204/12422; B60G 2204/124;
(Continued)

(56) References Cited

U.S. PATENT DOCUMENTS 6,398,201 B1 *  6/2002  Solomond ............... F16F 1/126
                                          280/124.147
9,649,905 B2 *  5/2017  Hernette ............... F16F 9/3235
(Continued)

FOREIGN PATENT DOCUMENTS

DE    112019006462 T5 *  9/2021  ........... B60G 13/005
JP         3687332 B2 *  8/2005  ............. B29C 45/44
(Continued)

OTHER PUBLICATIONS

English Translation of JP2008068723A (Year: 2008).*
(Continued)

*Primary Examiner* — James A English
*Assistant Examiner* — Caitlin Anne Miller
(74) *Attorney, Agent, or Firm* — MATTINGLY & MALUR, PC

(57) ABSTRACT

This shock absorber is disposed between a vehicle body and an axle. The shock absorber includes a bottomed cylindrical cylinder, a spring seat, and a mold release rib. The spring seat is formed integrally with the cylinder. The spring seat protrudes in a radial direction of the cylinder from the cylinder to support a suspension spring. The mold release rib is formed integrally with the cylinder and the spring seat. The mold release rib connects an outer circumferential portion of the spring seat and the cylinder. The mold release rib has a face part provided at an outer end portion of the cylinder in the radial direction.

6 Claims, 10 Drawing Sheets

(58) Field of Classification Search
CPC .... B60G 2206/8101; F16F 1/12; F16F 1/126; F16F 9/3242
See application file for complete search history.

(56) References Cited

U.S. PATENT DOCUMENTS

| | | | |
|---|---|---|---|
| 2002/0135213 A1* | 9/2002 | Fullenkamp | B60G 15/063 |
| | | | 297/311 |
| 2016/0031282 A1 | 2/2016 | Hernette et al. | |
| 2016/0137017 A1* | 5/2016 | Wilkin | B60G 15/062 |
| | | | 267/221 |

FOREIGN PATENT DOCUMENTS

| | | | |
|---|---|---|---|
| JP | 2008068723 A | * | 3/2008 |
| JP | 2016-53408 A | | 4/2016 |
| KR | 20030096621 A | * | 12/2002 |
| KR | 20180068139 A | * | 6/2018 |
| WO | 2014/129543 A1 | | 8/2014 |

OTHER PUBLICATIONS

International Search Report received in corresponding International Application No. PCT/JP2021/031708 dated Sep. 21, 2021.
Written Opinion received in corresponding International Application No. PCT/JP2021/031708 dated Sep. 21, 2021.

* cited by examiner

SHOCK ABSORBER

TECHNICAL FIELD

The present invention relates to a shock absorber.

Priority is claimed on Japanese Patent Application No. 2020-148890 filed on Sep. 4, 2020, the content of which is incorporated herein by reference.

BACKGROUND ART

A shock absorber having a configuration in which a fitting part is formed in a cylinder, a metal seat is fitted in the fitting part, and a resin seat is placed on the metal seat is known (see, for example, Patent Document 1). Also, a shock absorber having a strut in which an inner portion made of a metal and an outer portion made of a composite material having a seat are integrally formed is known (see, for example, Patent Document 2).

CITATION LIST

Patent Document

[Patent Document 1]
  Japanese Unexamined Patent Application, First Publication No. 2016-53408
[Patent Document 2]
  PCT International Publication No. WO 2014/129543

SUMMARY OF THE INVENTION

Technical Problem

There is a demand to suppress an increase in cost of a shock absorber.

The present invention provides a shock absorber capable of suppressing an increase in cost.

Solution to Problem

According to a first aspect of the present invention, a shock absorber includes a bottomed cylindrical cylinder, a spring seat, and a rib. The spring seat is formed integrally with the cylinder. The spring seat protrudes in a radial direction of the cylinder from the cylinder to support a suspension spring. The rib is formed integrally with the cylinder and the spring seat. The rib connects an outer circumferential portion of the spring seat and the cylinder. The rib has a face part provided at an outer end portion of the cylinder in the radial direction.

Advantageous Effects of Invention

According to the shock absorber described above, an increase in cost can be suppressed.

DESCRIPTION OF EMBODIMENTS

First Embodiment

A shock absorber according to a first embodiment of the present invention will be described below with reference to FIGS. 1 to 10.

Figure 1:
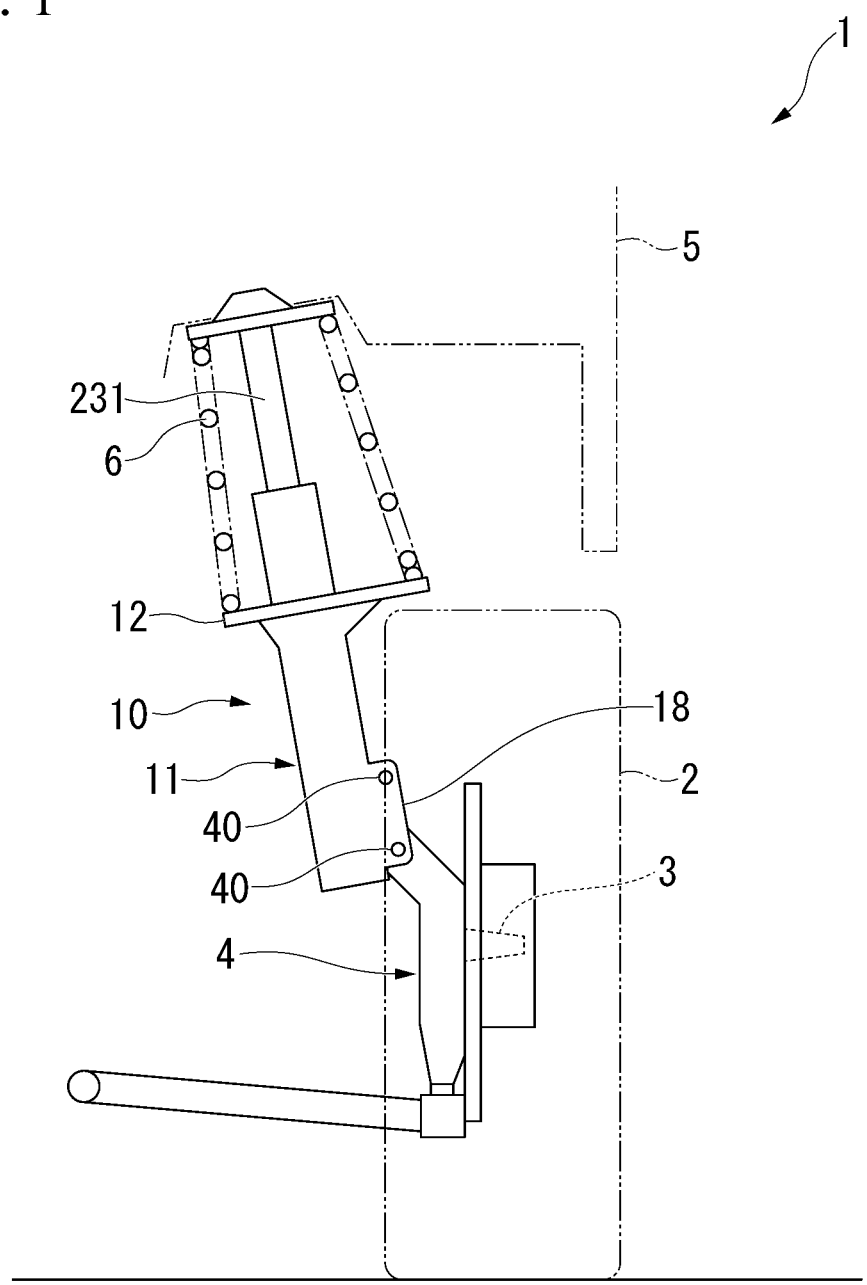
FIG. 1 is a front view schematically illustrating a part of a vehicle including a shock absorber according to a first embodiment of the present invention.

FIG. 1 is a view schematically illustrating a part of a vehicle 1 including a shock absorber 10 of the first embodiment. The vehicle 1 includes a wheel 2, an axle 3, a knuckle 4, the shock absorber 10 of the first embodiment, and a suspension spring 6. The axle 3 rotates integrally with the wheel 2. The knuckle 4 supports the axle 3 to be rotatable. The shock absorber 10 has one end connected to the knuckle 4 and the other end connected to a vehicle body 5. The suspension spring 6 is disposed between the shock absorber 10 and the vehicle body 5. The shock absorber 10 is disposed between the vehicle body 5 and the axle 3. The shock absorber 10 is a shock absorber used for a suspension system of an automobile. Specifically, the shock absorber 10 is a shock absorber used in a strut-type suspension of an automobile.

Figure 2:
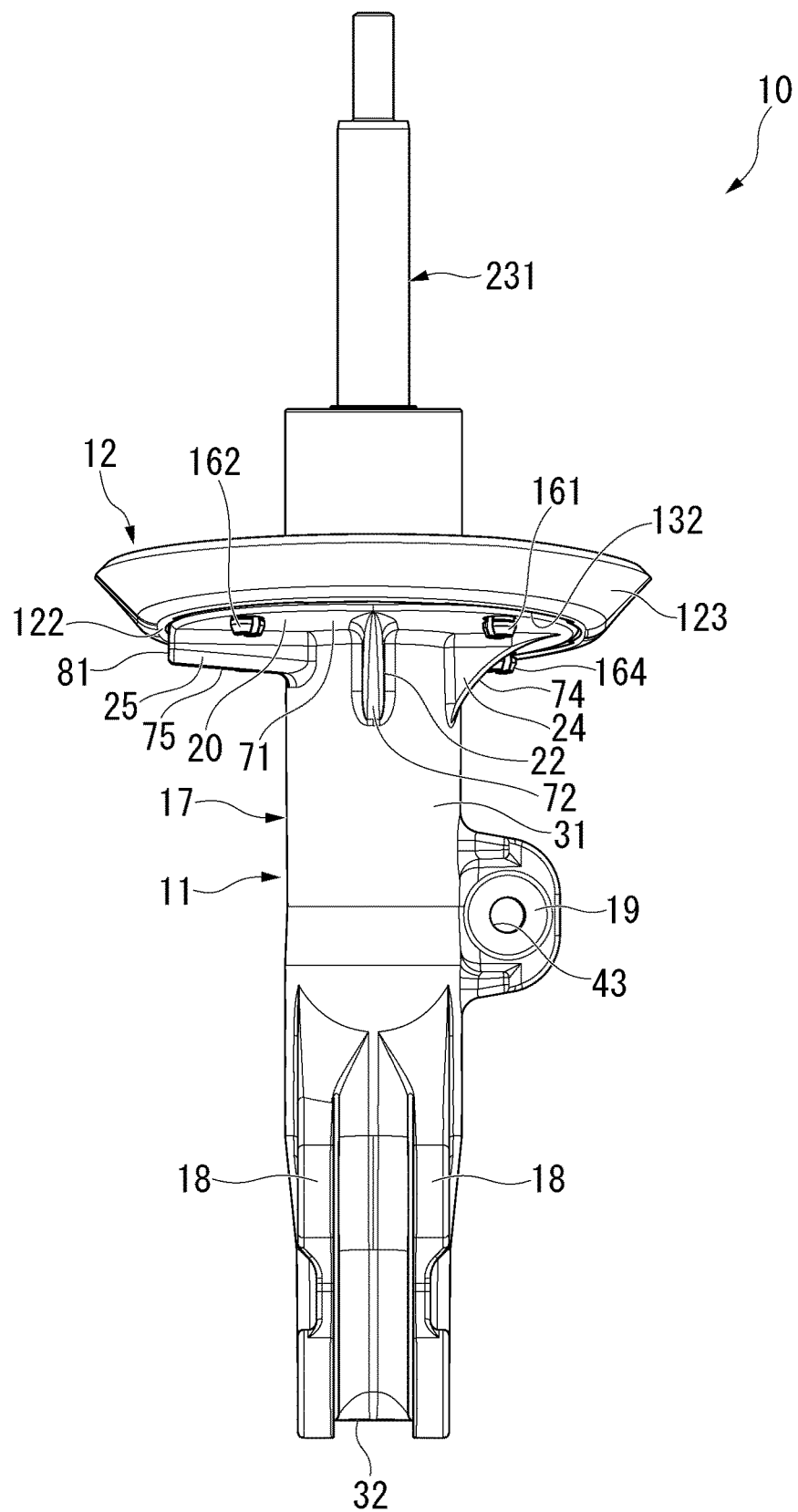
FIG. 2 is a side view illustrating the shock absorber according to the first embodiment of the present invention.
Figure 3:
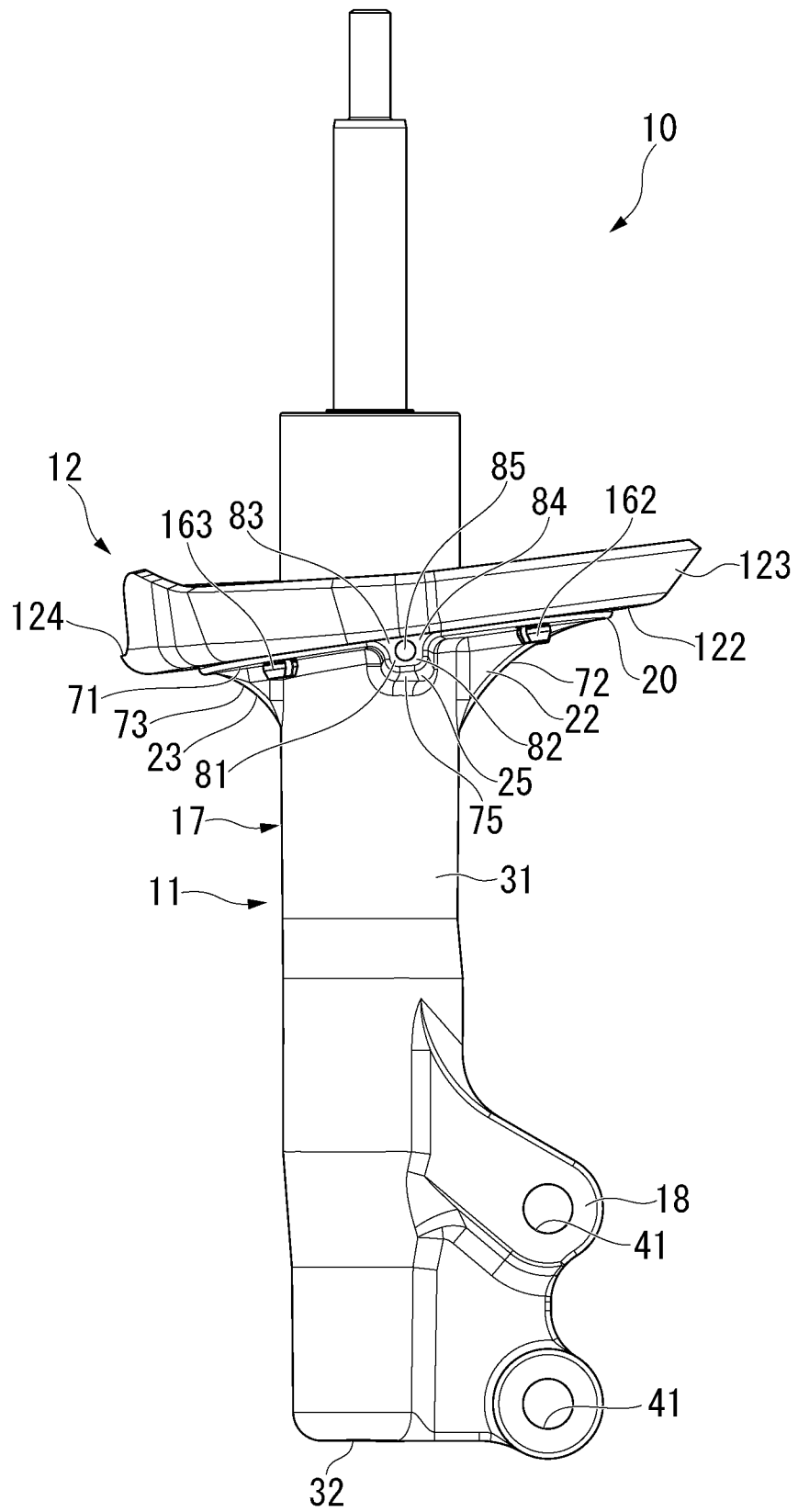
FIG. 3 is a front view illustrating the shock absorber according to the first embodiment of the present invention.
Figure 4:
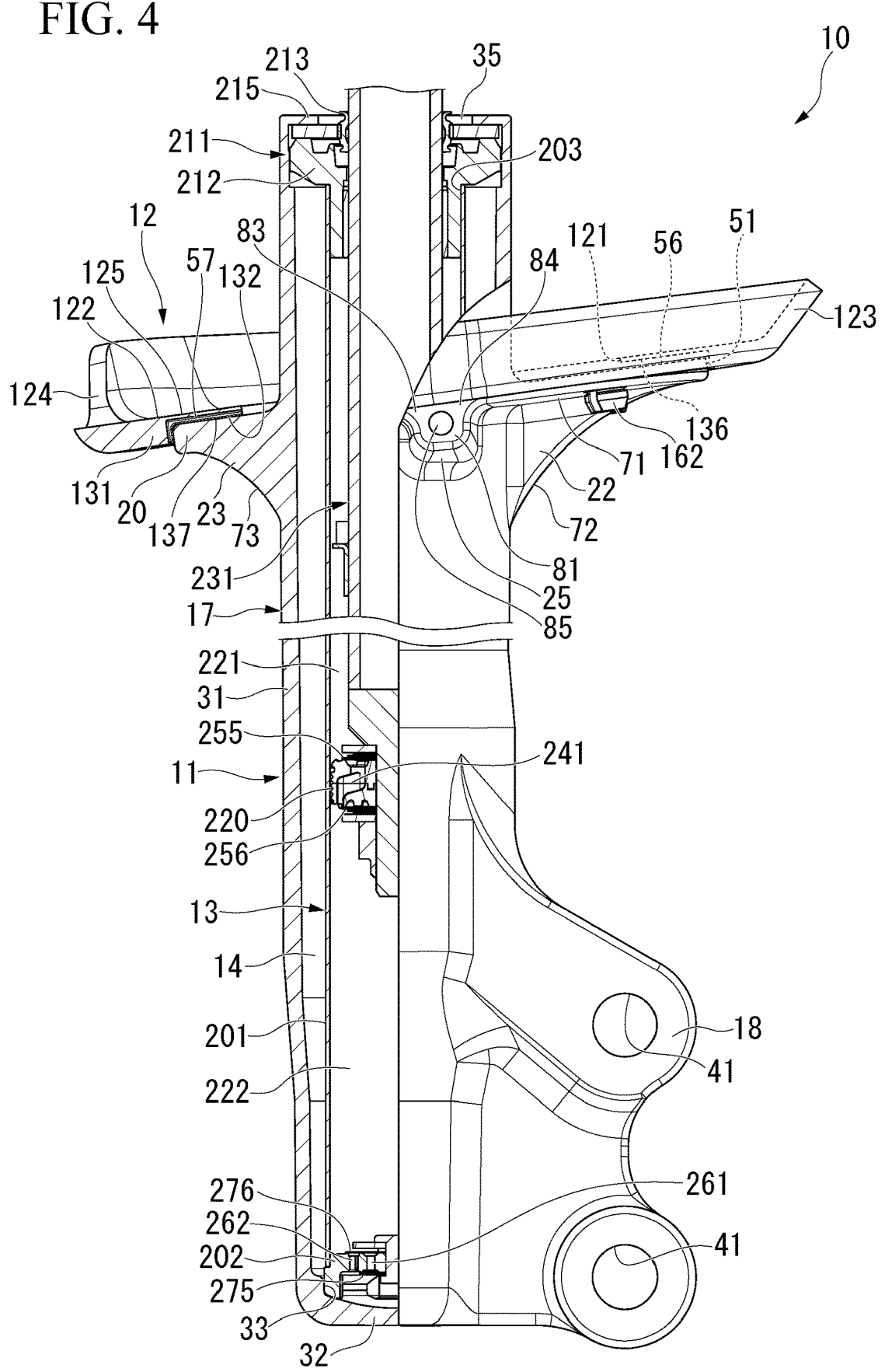
FIG. 4 is a partial front view illustrating the shock absorber according to the first embodiment of the present invention with a part thereof cross-sectioned.

As illustrated in FIGS. 2 and 3, the shock absorber 10 includes a bottomed cylindrical outer member 11 and a spring receiving member 12 attached to the outer member 11. Also, the shock absorber 10 includes a bottomed cylindrical inner member 13 provided inside the outer member 11 as illustrated in FIG. 4. A reservoir chamber 14 is formed between the outer member 11 and the inner member 13. A working liquid is sealed inside the inner member 13 as a working fluid. A working liquid and a working gas is sealed in the reservoir chamber 14 as a working fluid.

The outer member 11 is an integrally molded product that is formed integrally and seamlessly. The outer member 11 is formed of a metal that is shaped by heat and a force. Specifically, the outer member 11 is formed by casting an aluminum alloy. The outer member 11 includes a bottomed cylindrical outer cylinder 17 (cylinder), a pair of main brackets 18, a support bracket 19, and a spring seat 20. As illustrated in FIG. 2, the pair of main brackets 18 extend outward in a radial direction of the outer cylinder 17 from the outer cylinder 17. The support bracket 19 extends outward in the radial direction of the outer cylinder 17 from the outer cylinder 17. The spring seat 20 extends outward in the radial direction of the outer cylinder 17 from the outer cylinder 17. As illustrated in FIGS. 2 and 3, the outer member 11 includes a plurality of, specifically three, reinforcing ribs 22 to 24 and one mold release rib 25 (rib). In the outer member 11, the outer cylinder 17, the pair of main brackets 18, the support bracket 19, the spring seat 20, the reinforcing ribs 22 to 24, and the mold release rib 25 are seamlessly integrally formed by casting. In other words, the spring seat 20 is formed integrally with the outer cylinder 17, and the mold release rib 25 is formed integrally with the outer cylinder 17 and the spring seat 20.

As illustrated in FIG. 4, the outer cylinder 17 includes a cylindrical side wall part 31, a bottom part 32, a protruding part 33, and an opening 35. The bottom part 32 closes one end side of the side wall part 31 in an axial direction. The protruding part 33 protrudes inward in the radial direction of the side wall part 31 from the bottom part 32 side in the axial direction of an inner circumferential surface of the side wall part 31. The opening 35 is positioned on a side of the side wall part 31 opposite to the bottom part 32 in the axial direction. Therefore, the outer cylinder 17 has the opening 35 on one axial end side and the bottom part 32 on the other axial end side. A plurality of protruding parts 33 are intermittently formed at intervals in a circumferential direction of the outer cylinder 17.

Hereinafter, a direction in which a central axis of the outer cylinder 17 extends is referred to as a cylinder axial direction. A direction perpendicular to the central axis of the outer cylinder 17 is referred to as a cylinder radial direction. A circumferential direction centered on the central axis of the outer cylinder 17 is referred to as a cylinder circumferential direction.

Figure 5:
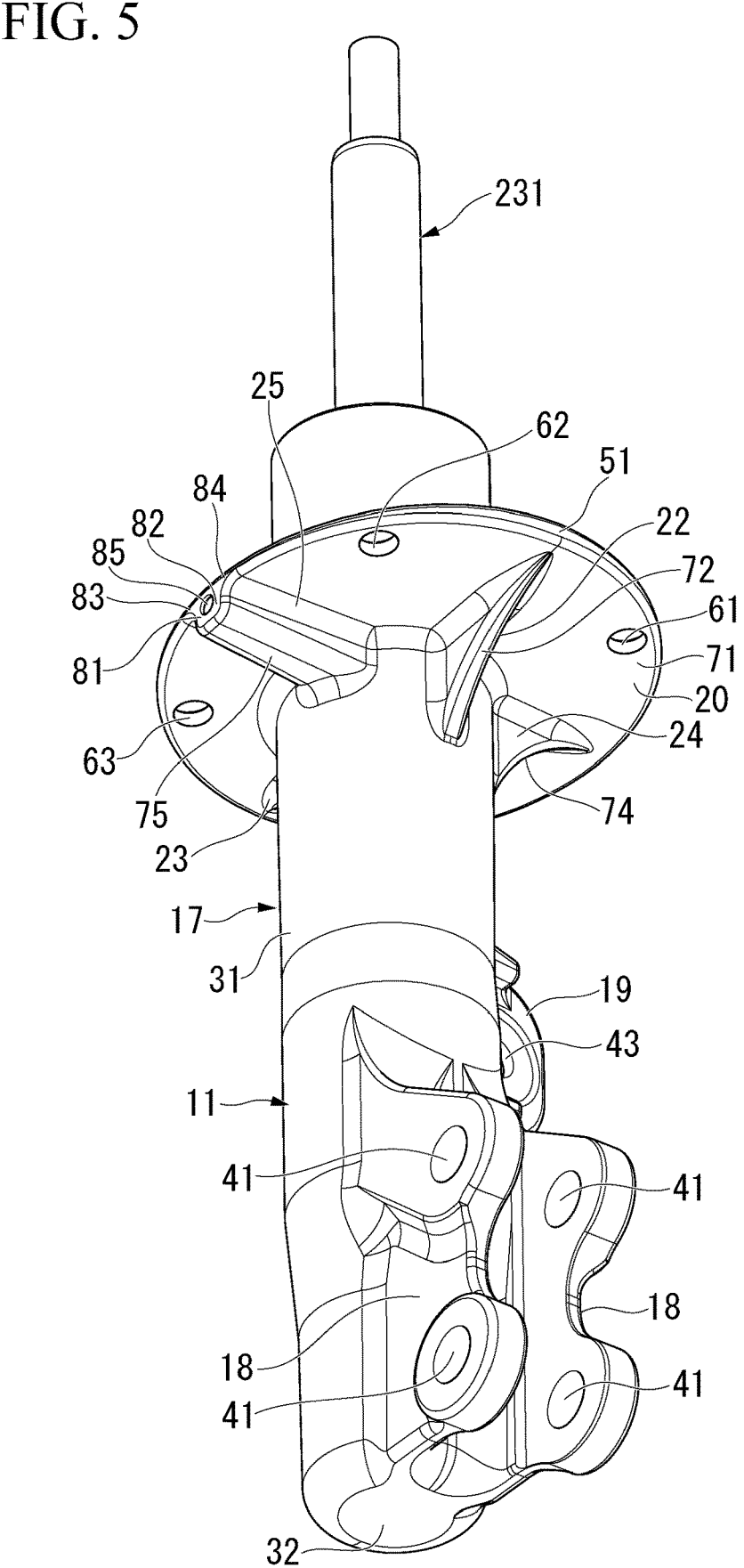
FIG. 5 is a perspective view of the shock absorber according to the first embodiment of the present invention, excluding a spring receiving member.

As illustrated in FIG. 5, the pair of main brackets 18 are provided at a portion of the side wall part 31 of the outer cylinder 17 on the bottom part 32 side. The pair of main brackets 18 extend outward in the cylinder radial direction from positions of the outer cylinder 17 spaced apart from each other in the cylinder circumferential direction. The pair of main brackets 18 have a plate shape and are substantially parallel to each other. The pair of main brackets 18 extend from the outer cylinder 17 to the same side in the cylinder radial direction. Both of the pair of main brackets 18 extend in the cylinder axial direction and in the cylinder radial direction.

The knuckle 4 illustrated in FIG. 1 is disposed between the pair of main brackets 18. The pair of main brackets 18 are fixed to the knuckle 4 with fasteners 40. As illustrated in FIG. 5, two insertion holes 41 into which the fasteners 40 for attachment to the knuckle 4 are inserted are formed in each of the main brackets 18.

As illustrated in FIG. 2, the support bracket 19 is provided at a portion on a side of the side wall part 31 of the outer cylinder 17 opposite to the bottom part 32 with respect to the pair of main brackets 18 in the cylinder axial direction. The support bracket 19 extends outward in the cylinder radial direction from the outer cylinder 17. The support bracket 19 has a plate shape. The support bracket 19 extends in the cylinder axial direction and in the cylinder radial direction. The support bracket 19 is provided to have a phase difference of approximately 90° in the cylinder circumferential direction from a center position between the pair of main brackets 18 in the cylinder circumferential direction. The support bracket 19 is a portion that supports a stabilizer (not illustrated). One attachment hole 43 is formed in the support bracket 19. A connector (not illustrated) for connecting the stabilizer is attached to the attachment hole 43.

Figure 6:
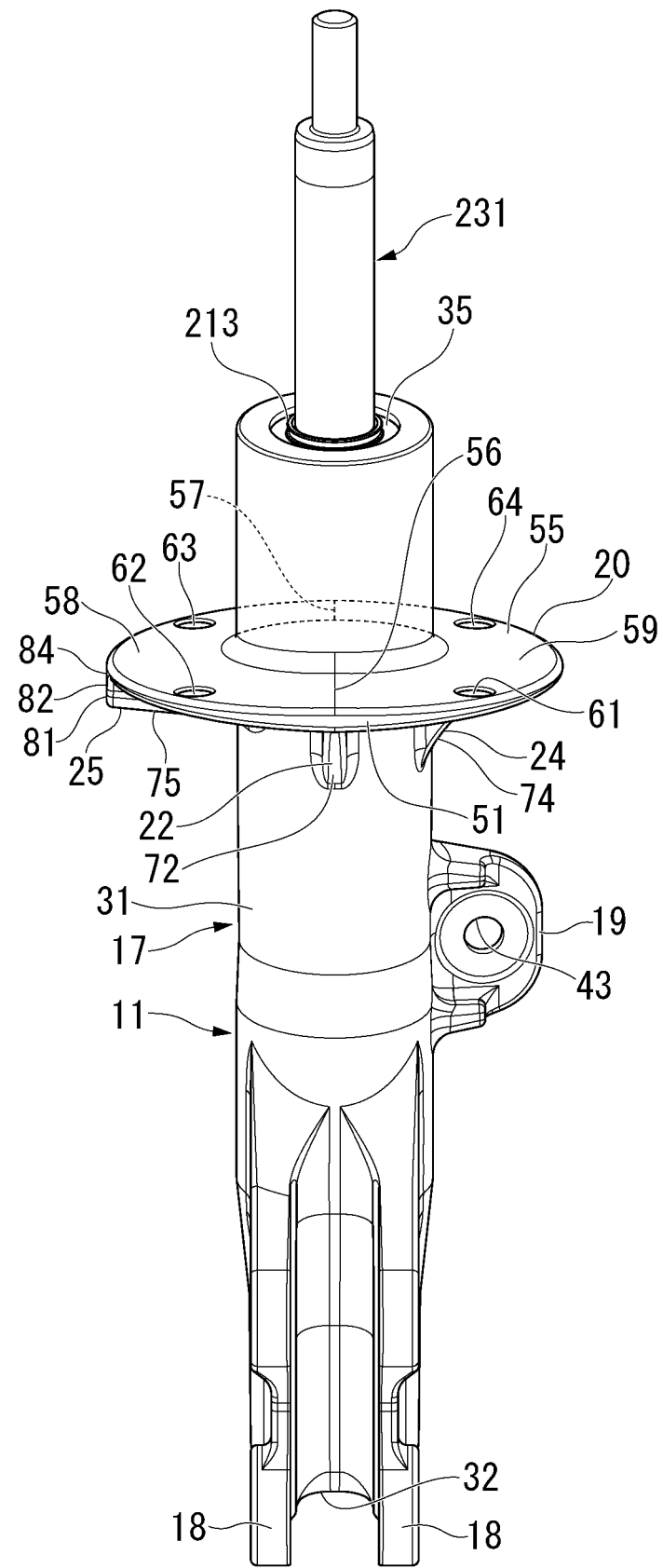
FIG. 6 is a perspective view of the shock absorber according to the first embodiment of the present invention, excluding the spring receiving member.

As illustrated in FIG. 6, the spring seat 20 is provided at a portion on a side of the side wall part 31 of the outer cylinder 17 opposite to the bottom part 32 with respect to the support bracket 19 in the cylinder axial direction. The spring seat 20 protrudes outward in the cylinder radial direction from the outer cylinder 17. The spring seat 20 has a circular flat plate shape. The spring seat 20 has a circular outer circumferential end surface 51. The spring seat 20 extends outward in the cylinder radial direction from the entire circumference of the side wall part 31 in the cylinder circumferential direction.

As illustrated in FIG. 4, a central axis of the spring seat 20 is inclined to intersect the central axis of the outer cylinder 17. In a cylinder radial direction passing through the central axis of the outer cylinder 17 and a center position between the pair of main brackets 18 in the cylinder circumferential direction, the spring seat 20 is inclined to become further away from the bottom part 32 in the cylinder axial direction toward the outside in a direction in which the pair of main brackets 18 extend. In the cylinder radial direction, the spring seat 20 is inclined to approach the bottom part 32 in the cylinder axial direction outward in a direction opposite to the direction in which the pair of main brackets 18 extend. In other words, the spring seat 20 has a first portion on the same side as that of the direction in which the pair of main brackets 18 extend from the outer cylinder 17 in the cylinder circumferential direction, and a second portion on a side opposite thereto. The spring seat 20 is inclined such that the first portion becomes further away from the bottom part 32 in the cylinder axial direction with respect to the second portion.

The outer circumferential end surface 51 of the spring seat 20 has a first portion on the same side as that of the direction in which the pair of main brackets 18 extend from the outer cylinder 17 in the cylinder circumferential direction, and a second portion on a side opposite thereto. In the outer circumferential end surface 51 of the spring seat 20, the first portion has a longer distance from the central axis of the outer cylinder 17 in the cylinder radial direction than that of the second portion therefrom. The outer circumferential end surface 51 of the spring seat 20 has a longest distance in the cylinder radial direction from the central axis of the outer cylinder 17 at a position that is in phase in the cylinder circumferential direction with the center position between the pair of main brackets 18 in the cylinder circumferential direction. Also, the outer circumferential end surface 51 has a shortest distance in the cylinder radial direction from the central axis of the outer cylinder 17 at a position that is 180° out of phase in the cylinder circumferential direction with the center position between the pair of main brackets 18 in the cylinder circumferential direction.

As illustrated in FIG. 6, the spring seat 20 has a support surface 55 and two parting lines 56 and 57. The support surface 55 faces toward the opening 35 in the cylinder axial direction. The two parting lines 56 and 57 slightly protrude from the support surface 55 toward the opening 35 in the cylinder axial direction. Similarly to the spring seat 20, the support surface 55 is inclined in the cylinder radial direction passing through the central axis of the outer cylinder 17 and the center position between the pair of main brackets 18 in the cylinder circumferential direction. That is, in the cylinder radial direction, the support surface 55 is inclined to become further away from the bottom part 32 in the cylinder axial direction toward the outside in the direction in which the pair of main brackets 18 extend. The support surface 55 is inclined to approach the bottom part 32 in the cylinder axial direction outward in a direction opposite to the direction in which the pair of main brackets 18 extend.

Both the two parting lines 56 and 57 are straight lines extending in the cylinder radial direction. The two parting lines 56 and 57 are disposed on the same straight line. The two parting lines 56 and 57 are respectively formed on radius lines passing through the center of both the spring seat 20 and the outer cylinder 17. One parting line 56 is disposed at a position that is in phase in the cylinder circumferential direction with the center position between the pair of main brackets 18 in the cylinder circumferential direction. The other parting line 57 is disposed at a position that is 180° out of phase in the cylinder circumferential direction with the center position. As illustrated in FIG. 4, similarly to the spring seat 20, the parting lines 56 and 57 are inclined in the cylinder radial direction passing through the central axis of the outer cylinder 17 and the center position between the pair of main brackets 18 in the cylinder circumferential direction. That is, in the cylinder radial direction, the parting lines 56 and 57 are inclined to become further away from the bottom part 32 in the cylinder axial direction toward the outside in the direction in which the pair of main brackets 18 extend. The parting lines 56 and 57 are inclined to approach the bottom part 32 in the cylinder axial direction outward in a direction opposite to the direction in which the pair of main brackets 18 extend.

As illustrated in FIG. 6, the support surface 55 has a pair of planar sloped surfaces 58 and 59. The pair of sloped surfaces 58 and 59 are inclined such that heights thereof in the axial direction of the spring seat 20 become lower with distance away from the parting lines 56 and 57. In other words, the parting lines 56 and 57 are provided at a boundary position between the pair of sloped surfaces 58 and 59. Similarly to the spring seat 20, the sloped surfaces 58 and 59 are inclined in the cylinder radial direction passing through the central axis of the outer cylinder 17 and the center position between the pair of main brackets 18 in the cylinder circumferential direction. That is, in the cylinder radial direction, the sloped surfaces 58 and 59 are inclined to become further away from the bottom part 32 in the cylinder axial direction toward the outside in the direction in which the pair of main brackets 18 extend. The sloped surfaces 58 and 59 are inclined to approach the bottom part 32 in the cylinder axial direction outward in a direction opposite to the direction in which the pair of main brackets 18 extend.

A plurality of, specifically four, fitting holes 61, 62, 63, and 64 are formed in the spring seat 20 at slightly inner positions in the cylinder radial direction with respect to the outer circumferential end surface 51. The fitting holes 61, 62, 63, and 64 are disposed in that order at a pitch of 90° in the circumferential direction of the spring seat 20. The fitting holes 61 and 62 are provided on the same side as the parting line 56 with respect to the outer cylinder 17 in the radial direction of the spring seat 20. The fitting holes 63 and 64 are provided on the same side as the parting line 57 with respect to the outer cylinder 17 in the radial direction of the spring seat 20. The fitting hole 61 is disposed on the support bracket 19 side with respect to the parting line 56 in the cylinder circumferential direction. The fitting hole 62 is disposed on a side opposite to the support bracket 19 with respect to the parting line 56 in the cylinder circumferential direction. The fitting hole 63 is disposed on a side opposite to the support bracket 19 with respect to the parting line 57 in the cylinder circumferential direction. The fitting hole 64 is disposed on the support bracket 19 side with respect to the parting line 57 in the cylinder circumferential direction.

As illustrated in FIGS. 2 to 4, the spring receiving member 12 is attached to such a spring seat 20. Thereby, the spring seat 20 of the outer member 11 supports the suspension spring 6 illustrated in FIG. 1 via the spring receiving member 12.

The reinforcing ribs 22 to 24 and the mold release rib 25 illustrated in FIGS. 2 to 5 all reinforce the spring seat 20. As illustrated in FIG. 6, the parting lines 56 and 57 are positioned on the support surface 55. The reinforcing ribs 22 to 24 and the mold release rib 25 are formed on a side opposite to the support surface 55 side. As illustrated in FIG. 5, the reinforcing ribs 22 to 24 and the mold release rib 25 are disposed in order of the reinforcing rib 22, the mold release rib 25, the reinforcing rib 23, and the reinforcing rib 24 at a pitch of 90° in the circumferential direction of the spring seat 20.

As illustrated in FIG. 6, the reinforcing rib 22 is disposed at a position that is in phase in the cylinder circumferential direction with the center position between the pair of main brackets 18 in the cylinder circumferential direction. Therefore, the reinforcing rib 22 is disposed at a position that is in phase with the parting line 56 in the cylinder circumferential direction. As illustrated in FIG. 5, the spring seat 20 has a base surface 71 facing the bottom part 32 side in the cylinder axial direction. The reinforcing rib 22 protrudes from the base surface 71 of the spring seat 20 to the bottom part 32 side in the cylinder axial direction.

The reinforcing rib 22 connects a slightly inner position in the radial direction of the spring seat 20 with respect to the outer circumferential end surface 51 of the spring seat 20 and an outer circumferential portion of the outer cylinder 17. In other words, the reinforcing rib 22 extends from an outer circumferential surface of the outer cylinder 17 to just short of the outer circumferential end surface 51 of the spring seat 20. The reinforcing rib 22 is formed on a radius line passing through a center of the spring seat 20. The reinforcing rib 22 is formed on a radius line passing through a center of the outer cylinder 17. Also, the reinforcing rib 22 protrudes from the base surface 71 so that an amount of protrusion from the base surface 71 increases toward the outer cylinder 17 in the radial direction of the spring seat 20. The reinforcing rib 22 includes an outer end edge portion 72 facing the bottom part 32 side in the cylinder axial direction. The outer end edge portion 72 of the reinforcing rib 22 has an arc shape.

The reinforcing rib 23 illustrated in FIG. 3 is disposed at a position that is 180° out of phase in the cylinder circumferential direction with respect to the center position between the pair of main brackets 18 in the cylinder circumferential direction. Therefore, as illustrated in FIG. 4, the reinforcing rib 23 is disposed at a position that is in phase with the parting line 57 in the cylinder circumferential direction. The reinforcing rib 23 protrudes from the base surface 71 of the spring seat 20 to the bottom part 32 side in the cylinder axial direction.

The reinforcing rib 23 connects a slightly inner position in the radial direction of the spring seat 20 with respect to the outer circumferential end surface 51 of the spring seat 20 and an outer circumferential portion of the outer cylinder 17. In other words, the reinforcing rib 23 extends from the outer circumferential surface of the outer cylinder 17 to just short of the outer circumferential end surface 51 of the spring seat 20. The reinforcing rib 23 is formed on a radius line passing through the center of the spring seat 20. Also, the reinforcing rib 23 is formed on a radius line passing through the center of the outer cylinder 17. The reinforcing rib 23 protrudes from the base surface 71 so that an amount of protrusion from the base surface 71 increases toward the outer cylinder 17 in the radial direction of the spring seat 20. The reinforcing rib 23 includes an outer end edge portion 73 facing the bottom part 32 side in the cylinder axial direction. The outer end edge portion 73 of the reinforcing rib 23 has an arc shape.

As illustrated in FIG. 5, the reinforcing rib 24 is formed on the support bracket 19 side in the cylinder circumferential direction between the reinforcing ribs 22 and 23. The reinforcing rib 24 is formed slightly on the reinforcing rib 22 side with respect to the support bracket 19 in the cylinder circumferential direction. The reinforcing rib 24 is provided to be slightly shifted to the pair of main brackets 18 side with respect to the central axis of the outer cylinder 17 in the cylinder radial direction passing through the center position between the pair of main brackets 18. The reinforcing rib 24 protrudes from the base surface 71 of the spring seat 20 to the bottom part 32 side in the cylinder axial direction.

The reinforcing rib 24 connects a slightly inner position in the radial direction of the spring seat 20 with respect to the outer circumferential end surface 51 of the spring seat 20 and an outer circumferential portion of the outer cylinder 17. In other words, the reinforcing rib 24 extends from the outer circumferential surface of the outer cylinder 17 to just short of the outer circumferential end surface 51 of the spring seat 20. The reinforcing rib 24 is formed on a radius line passing through the center of the spring seat 20. The reinforcing rib 24 protrudes from the base surface 71 so that an amount of protrusion from the base surface 71 increases toward the outer cylinder 17 in the radial direction of the spring seat 20. The reinforcing rib 24 includes an outer end edge portion 74 facing the bottom part 32 side in the cylinder axial direction. The outer end edge portion 74 of the reinforcing rib 24 has an arc shape. As illustrated in FIG. 6, the reinforcing rib 24 overlaps the sloped surface 59 in position in the circumferential direction of the spring seat 20.

The reinforcing ribs 22 to 24 each have an end portion at an end position on the outer cylinder 17 side and positioned closest to the bottom part 32 side in the cylinder axial direction. The end portions of the reinforcing ribs 22 to 24 are disposed at substantially the same position in the cylinder axial direction. The reinforcing ribs 22 to 24 each have an end portion on an outer side in the radial direction of the spring seat 20. The end portions of the reinforcing ribs 22 to 24 are disposed at positions substantially equidistant from the central axis of the spring seat 20. In other words, in the reinforcing ribs 22 to 24, shortest distances between the end portions on the outer side in the radial direction of the spring seat 20 and the outer circumferential end surface 51 are substantially the same as each other.

As illustrated in FIG. 5, the mold release rib 25 is formed on a side opposite to the support bracket 19 in the cylinder circumferential direction between the reinforcing ribs 22 and 23. The mold release rib 25 is formed slightly on the reinforcing rib 22 side with respect to a position that is 180° out of phase with the support bracket 19 in the cylinder circumferential direction. The mold release rib 25 is provided to be slightly shifted to the pair of main brackets 18 side with respect to the central axis of the outer cylinder 17 in the cylinder radial direction passing through the center position between the pair of main brackets 18. The mold release rib 25 protrudes from the base surface 71 of the spring seat 20 to the bottom part 32 side in the cylinder axial direction. As illustrated in FIG. 6, the mold release rib 25 overlaps the sloped surface 58 in position in the circumferential direction of the spring seat 20.

As illustrated in FIG. 5, the mold release rib 25 connects an outer circumferential portion of the spring seat 20 and the outer circumferential portion of the outer cylinder 17. In other words, the mold release rib 25 extends from the outer circumferential surface of the outer cylinder 17 to the outer circumferential end surface 51 of the spring seat 20. The mold release rib 25 is formed on a radius line passing through the center of the spring seat 20. The mold release rib 25 is formed on the same diameter line passing through the center of the spring seat 20 as the reinforcing rib 24. The mold release rib 25 protrudes from the base surface 71 so that an amount of protrusion from the base surface 71 increases toward the outer cylinder 17 in the radial direction of the spring seat 20. The mold release rib 25 includes an outer end edge portion 75 facing the bottom part 32 side in the cylinder axial direction. The outer end edge portion 75 of the mold release rib 25 has a planar shape. The mold release rib 25 has an end portion at an end position on the outer cylinder 17 side and closest to the bottom part 32 side in the cylinder axial direction. The end portion of the mold release rib 25 is disposed on a side opposite to the bottom part 32 in the cylinder axial direction with respect to the reinforcing ribs 22 to 24. As illustrated in FIG. 6, the mold release rib 25 extends in a direction perpendicular to the parting lines 56 and 57.

As illustrated in FIG. 5, the mold release rib 25 is connected to the outer circumferential surface of the outer cylinder 17 at an inner end portion in the radial direction of the spring seat 20. An outer end portion of the mold release rib 25 in the radial direction of the spring seat 20 is a face part 81 facing outward in the radial direction of the spring seat 20. In other words, the mold release rib 25 connects the outer circumferential end surface 51 of the outer circumferential portion of the spring seat 20 and the outer cylinder 17. The mold release rib 25 has the face part 81 at an outer end portion in the cylinder radial direction.

The face part 81 includes a flat surface portion 82 and a pair of curved surface portions 83 and 84. The flat surface portion 82 extends in a central axis direction of the outer cylinder 17. The pair of curved surface portions 83 and 84 are provided between the flat surface portion 82 and the outer circumferential end surface 51 of the spring seat 20. The pair of curved surface portions 83 and 84 smoothly connect the flat surface portion 82 to the outer circumferential end surface 51. The flat surface portion 82 is disposed such that a center position in the circumferential direction of the spring seat 20 is at the same position as the outer circumferential end surface 51 of the spring seat 20 in the cylinder radial direction. The flat surface portion 82 is connected to the outer circumferential end surface 51. The flat surface portion 82 extends in a tangential direction of the outer circumferential end surface 51 of the spring seat 20. In other words, the flat surface portion 82 extends perpendicular to a radius line passing through the central axis of the spring seat 20. The flat surface portion 82 has the same distance from the center of the spring seat 20 as a distance of the outer circumferential end surface 51 from the center of the spring seat 20. The flat surface portion 82 is a plane extending parallel to the parting lines 56 and 57 illustrated in FIG. 6 and parallel to the cylinder axial direction.

As illustrated in FIG. 5, the face part 81 has a circular mark 85 that is slightly recessed from the flat surface portion 82 on an inner side of the flat surface portion 82. The mark 85 is a mark generated when the outer member 11 is released from a casting mold at the time of casting. The mark 85 may be a distortion or the like other than a circular recessed shape. At least a part of the mark 85 is in a range on the inner side of the flat surface portion 82. More specifically, the entire of the mark 85 is in a range on the inner side of the flat surface portion 82.

Central axes of the fitting holes 61 to 64 are all parallel to a central axis of the outer circumferential end surface 51 of the spring seat 20. The center axes of the fitting holes 61 to 64 are disposed on the same circle. This circle is a circle centered on the central axis of the outer circumferential end surface 51. The central axes of the fitting holes 61 to 64 are each inclined with respect to the central axis of the outer cylinder 17. Of the fitting holes 61 to 64, the fitting holes 61 and 62 on a side close to the reinforcing rib 22 have the same distance from the central axis of the outer cylinder 17. Of the fitting holes 61 to 64, the fitting holes 63 and 64 on a side close to the reinforcing rib 23 have the same distance from the central axis of the outer cylinder 17. The distances of the fitting holes 61 and 62 from the central axis of the outer cylinder 17 are larger than the distances of the fitting holes 63 and 64 from the central axis of the outer cylinder 17.

Figure 7:
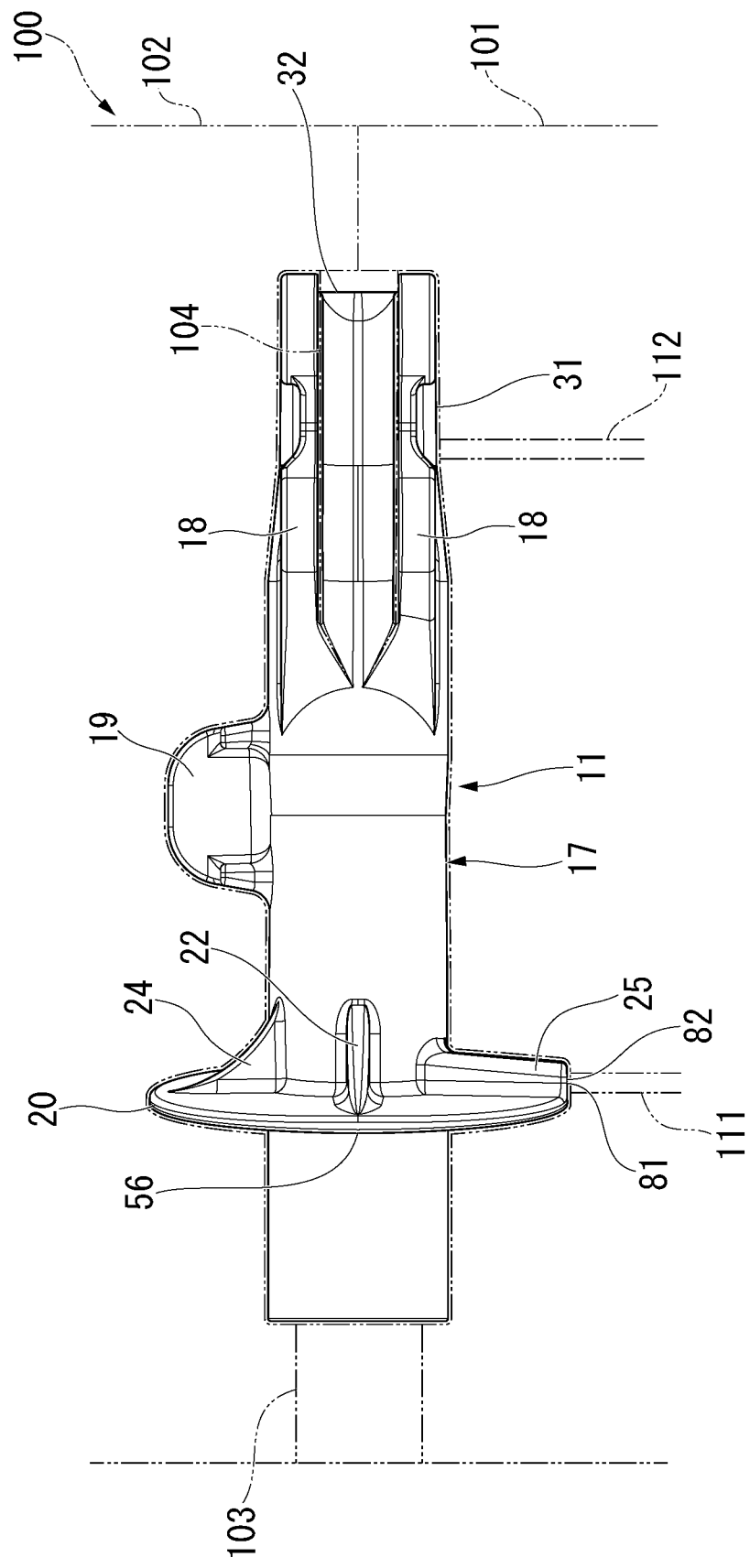
FIG. 7 is a side view schematically illustrating a casting mold for an outer member of the shock absorber according to the first embodiment of the present invention.

The outer member 11 is formed by casting except for four insertion holes 41, one attachment hole 43, four fitting holes 61 to 64, and the like. At that time, the outer member 11 is formed by a casting mold 100 that is divided into at least two in the cylinder radial direction as schematically illustrated in FIG. 7. The casting mold 100 has a first mold 101, a second mold 102, a third mold 103, and a fourth mold 104. The first mold 101 forms an outer half of the outer member 11 including the mold release rib 25. The second mold 102 forms an outer half of the outer member 11 including the support bracket 19 and the reinforcing rib 24. The third mold 103 forms an inner portion of the outer cylinder 17 of the outer member 11. The fourth mold 104 forms a space between the pair of main brackets 18. The reinforcing ribs 22 and 23 are formed on a side of a mating surface of the first mold 101 and the second mold 102 by the first mold 101 and the second mold 102. Also, the parting lines 56 and 57 described above are formed by the mating surface of the first mold 101 and the second mold 102.

A plurality of mold release pins 111 and 112 are provided in the first mold 101. After the outer member 11 is cast, the plurality of mold release pins 111 and 112 push the outer member 11 upward to release it from the first mold 101 in a state in which the second mold 102, the third mold 103, and the fourth mold 104 have been released from the outer member 11. The plurality of mold release pins 111 and 112 are lifted at the same time. At that time, the mold release pin 111 on one side comes into contact with the face part 81 of the mold release rib 25 of the outer member 11, and the mold release pin 112 on the other side comes into contact with a predetermined position of the side wall part 31 of the outer cylinder 17 of the outer member 11 on the bottom part 32 side. Thereby, the outer member 11 is pushed upward. At that time, the outer member 11 is not completely hardened. Therefore, the face part 81 is dented by a distal end portion of the columnar mold release pin 111 to form the circular mark 85 as illustrated in FIGS. 3 to 5. The pair of sloped surfaces 58 and 59 of the spring seat 20 illustrated in FIG. 6 serve as draft angles for easily pulling out the outer member 11 from the first mold 101 and the second mold 102.

Figure 8:
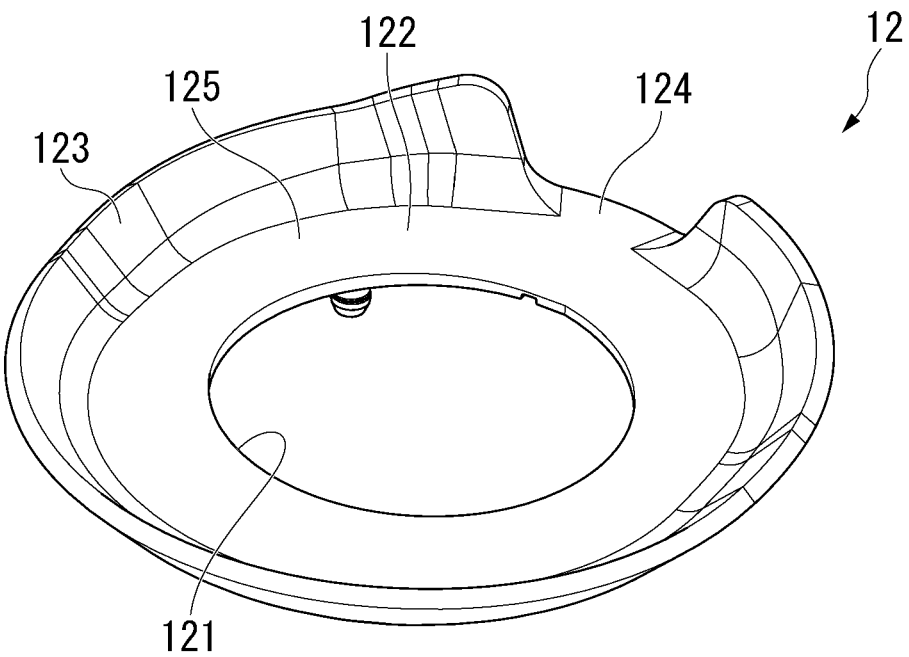
FIG. 8 is a perspective view illustrating the spring receiving member of the shock absorber according to the first embodiment of the present invention.
Figure 9:
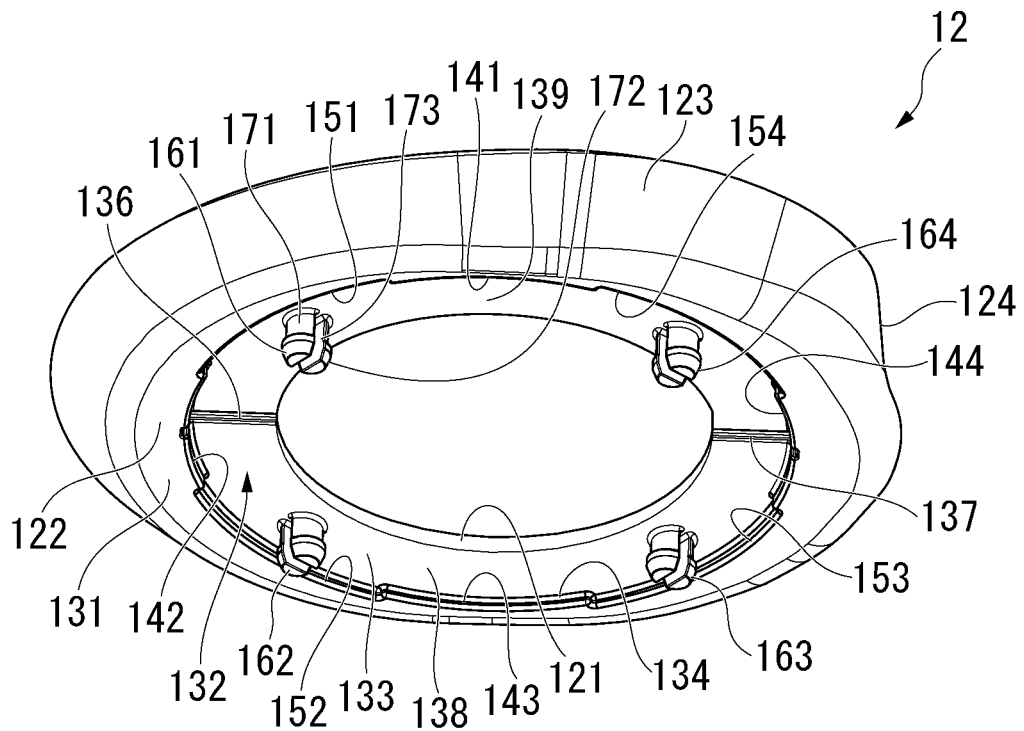
FIG. 9 is a perspective view illustrating the spring receiving member of the shock absorber according to the first embodiment of the present invention.
Figure 10:
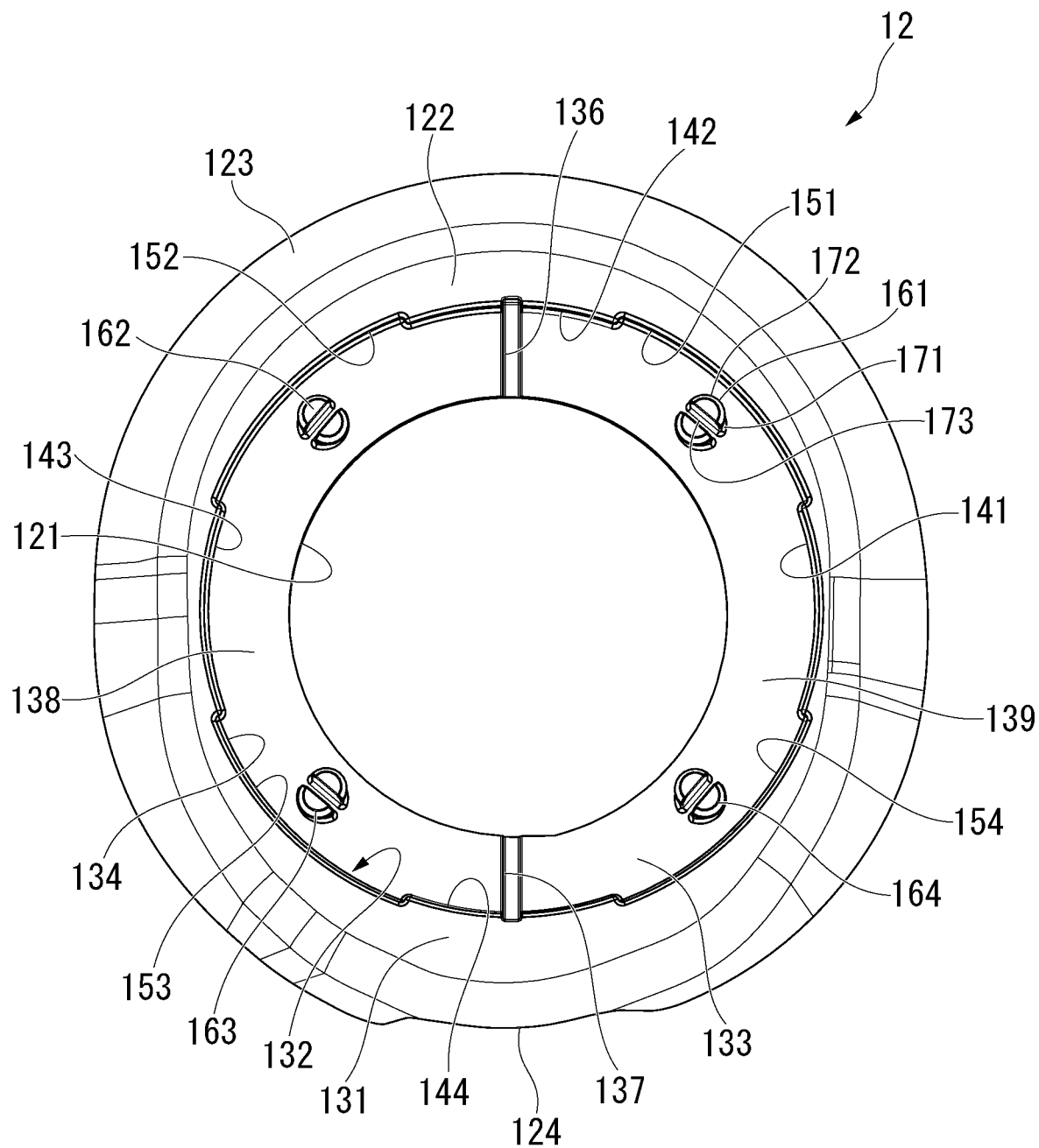
FIG. 10 is a bottom view illustrating the spring receiving member of the shock absorber according to the first embodiment of the present invention.

As illustrated in FIGS. 8 to 10, the spring receiving member 12 has a substantially bored disc shape. The spring receiving member 12 is seamlessly integrally formed of a resin material. As the resin material, for example, a polyamide synthetic resin (PA), a polyphenylene sulfide resin (PPS), and the like can be mentioned. These resin materials are used according to a required strength and a usage environment. As illustrated in FIG. 8, the spring receiving member 12 includes a suspension spring receiving part 122 having a bored disc shape and a protruding wall part 123. The suspension spring receiving part 122 has a circular insertion hole 121 formed on an inner circumferential side. The protruding wall part 123 protrudes to one side in the axial direction of the suspension spring receiving part 122 from an outer circumferential edge portion of the suspension spring receiving part 122. In the spring receiving member 12, the protruding wall part 123 is not formed throughout the entire circumference of the suspension spring receiving part 122, but has a notch part 124 in a part thereof. The protruding wall part 123 is continuous in a circumferential direction of the spring receiving member 12 except for the notch part 124. The protruding wall part 123 has a substantially conical shape in which a diameter thereof increases with distance away from the suspension spring receiving part 122 in the axial direction.

The suspension spring receiving part 122 has a spring receiving surface 125 on a side from which the protruding wall part 123 protrudes. The spring receiving surface 125 is a plane. As illustrated in FIG. 9, the suspension spring receiving part 122 includes a recessed part 132 on the insertion hole 121 side in the radial direction on a side opposite to the protruding wall part 123 in the axial direction. The recessed part 132 is recessed to the protruding wall part 123 side in the axial direction with respect to the surrounding plate part 131 therearound. The recessed part 132 has a bottom surface 133 (facing surface) and an inner circumferential wall surface 134. The bottom surface 133 is positioned on the protruding wall part 123 side in the axial direction. The inner circumferential wall surface 134 surrounds the entire circumference of the bottom surface 133. The inner circumferential wall surface 134 rises from the bottom surface 133 to a side opposite to the protruding wall part 123 in the axial direction.

Linear recesses 136 and 137 are formed in the recessed part 132. The recesses 136 and 137 are further recessed to the protruding wall part 123 side from the bottom surface 133 in the axial direction of the spring receiving member 12. As illustrated in FIG. 10, in the circumferential direction of the spring receiving member 12, the recess 136 and the notch part 124 are 180° out of phase with each other at their center positions. The recess 137 and the notch part 124 are in phase with each other at their center positions. The recesses 136 and 137 are respectively disposed on radius lines passing through the central axis of the spring receiving member 12. The recesses 136 and 137 are disposed on the same straight line.

The bottom surface 133 is divided into two regions by forming the recesses 136 and 137. The two regions are planar sloped surfaces 138 and 139. The sloped surfaces 138 and 139 are slightly inclined so that they are positioned further toward the protruding wall part 123 side in the axial direction of the spring receiving member 12 toward the recesses 136 and 137 side.

The inner circumferential wall surface 134 of the recessed part 132 includes a plurality of, specifically four, small-diameter wall surfaces 141, 142, 143, and 144, and a plurality of, specifically, four large-diameter wall surfaces 151, 152, 153, and 154. The four small-diameter wall surfaces 141, 142, 143, and 144 are disposed on the same conical surface. The four large-diameter wall surfaces 151, 152, 153, and 154 are disposed on the same conical surface. The inner circumferential wall surface 134 includes the small-diameter wall surface 141, the large-diameter wall surface 151, the small-diameter wall surface 142, the large-diameter wall surface 152, the small-diameter wall surface 143, the large-diameter wall surface 153, the small-diameter wall surface 144, and the large-diameter wall surface 154 in that order in the circumferential direction of the spring receiving member 12.

The four small-diameter wall surfaces 141 to 144 have the same shape. The four large-diameter wall surfaces 151 to 154 have the same shape. Inner diameters of the small-diameter wall surfaces 141 to 144 decrease toward the bottom surface 133 side. Inner diameters of the large-diameter wall surfaces 151 to 154 also decrease toward the bottom surface 133 side. Minimum inner diameters of the small diameter wall surfaces 141 to 144 are smaller than minimum inner diameters of the large diameter wall surfaces 151 to 154. The minimum inner diameters of the small-diameter wall surfaces 141 to 144 are equivalent to an outer diameter of the spring seat 20 of the outer member 11, that is, a diameter of the outer circumferential end surface 51.

In the circumferential direction of the spring receiving member 12, one small-diameter wall surface 144 of the small-diameter wall surfaces 141 to 144 is in phase with the notch part 124 at their center positions. Another small-diameter wall surface 142 of the small-diameter wall surfaces 141 to 144 is 180° out of phase with the notch part 124 at their center positions. The remaining two small-diameter wall surfaces 141 and 143 of the small-diameter wall surfaces 141 to 144 are 90° out of phase with the notch part 124 at their center positions in the circumferential direction of the spring receiving member 12. Therefore, in the circumferential direction of the spring receiving member 12, the small-diameter wall surface 142 and the recess 136 are in phase with each other at their center positions. The small-diameter wall surface 144 and the recess 137 are in phase with each other at their center positions. The recess 136 extends from the insertion hole 121 to a position beyond the small-diameter wall surface 142 in the radial direction of the spring receiving member 12. The recess 136 further extends to penetrate the small-diameter wall surface 142 in the axial direction of the spring receiving member 12. The recess 137 extends from the insertion hole 121 to a position beyond the small-diameter wall surface 144 in the radial direction of the spring receiving member 12. The recess 137 further extends to penetrate the small-diameter wall surface 144 in the axial direction of the spring receiving member 12.

In the circumferential direction of the spring receiving member 12, a fitting protrusion 161 is provided in phase with the large-diameter wall surface 151 at their center positions. A fitting protrusion 162 is provided in phase with the large-diameter wall surface 152 at their center positions. In the circumferential direction of the spring receiving member 12, a fitting protrusion 163 is provided in phase with the large-diameter wall surface 153 at their center positions. A fitting protrusion 164 is provided in phase with the large-diameter wall surface 154 at their center positions. The fitting protrusions 161 to 164 protrude from the bottom surface 133 of the recessed part 132 to a side opposite to the protruding wall part 123 in the axial direction of the spring receiving member 12. The fitting protrusions 161 to 164 have the same shape. As illustrated in FIG. 9, the fitting protrusions 161 to 164 each include a columnar neck part 171 protruding from the bottom surface 133, a tapered head part 172, and a slit 173. The head part 172 is on a side of the neck part 171 opposite to the bottom surface 133. The head part 172 has a larger diameter than the neck part 171. The slit 173 divides the neck part 171 and the head part 172 into two equal parts in the radial direction over the entire length in the axial direction.

The spring receiving member 12 is placed on the support surface 55 of the spring seat 20. At this time, the bottom surface 133 of the recessed part 132 faces the support surface 55 of the spring seat 20 illustrated in FIG. 6. The opening 35 side of the outer cylinder 17 of the outer member 11 with respect to the spring seat 20 is inserted into the insertion hole 121 on the inner circumferential side. The spring seat 20 is disposed in the recessed part 132. At that time, the fitting protrusion 161 is fitted into the fitting hole 61 while deforming the slit 173 to be narrowed, and the head part 172 protrudes from the base surface 71 to return to its original state. Thereby, the head part 172 is locked to the base surface 71. In parallel with this, similarly, the fitting protrusion 162 is fitted into the fitting hole 62, the fitting protrusion 163 is fitted into the fitting hole 63, and the fitting protrusion 164 is fitted into the fitting hole 64. Thereby, the spring receiving member 12 clamps the spring seat 20 with the suspension spring receiving part 122 and the head parts 172 of the fitting protrusions 161 to 164. As a result, the spring receiving member 12 is attached to the spring seat 20.

At that time, the spring seat 20 is fitted inside the small-diameter wall surfaces 141 to 144 of the recessed part 132 at the outer circumferential end surface 51 thereof. Also, at that time, the parting line 56 protruding from the support surface 55 of the spring seat 20 is fitted to be accommodated in the recess 136 provided on the bottom surface 133. The bottom surface 133 is a facing surface of the spring receiving member 12 facing the spring seat 20. The parting line 57 protruding from the support surface 55 of the spring seat 20 is similarly fitted to be accommodated in the recess 137 provided on the bottom surface 133. As a result, on the support surface 55 of the spring seat 20 and the bottom surface 133 of the recessed part 132, the sloped surface 58 and the sloped surface 138 are in contact with each other by surface contact, and the sloped surface 59 and the sloped surface 139 are in contact with each other by surface contact.

The spring receiving member 12 is fixed to the outer member 11 in the cylinder axial direction when the fitting protrusions 161 to 164 are fitted into the fitting holes 61 to 64. Also, in the spring receiving member 12, the sloped surface 138 and the sloped surface 58 are in contact with each other by surface contact, and the sloped surface 139 and the sloped surface 59 are in contact with each other by surface contact. At the same time, the parting line 56 is fitted in the recess 136 and the parting line 57 is fitted in the recess 137. Thereby, the spring receiving member 12 is fixed to the outer member 11 in the cylinder circumferential direction. In other words, the spring receiving member 12 stops rotation with respect to the outer member 11. Further, in the spring receiving member 12, the spring seat 20 is fitted inside the small-diameter wall surfaces 141 to 144 of the recessed part 132 at the outer circumferential end surface 51 thereof. Thereby, the spring receiving member 12 is fixed to the outer member 11 in an in-plane direction.

In this manner, the spring receiving member 12 attached to the spring seat 20 is fixed to the spring seat 20 without backlash in any direction. As illustrated in FIG. 4, with the spring receiving member 12 attached to the spring seat 20, the notch part 124 thereof and the reinforcing rib 23 are in phase with each other at their center positions in the cylinder circumferential direction.

The fitting protrusions 161 to 164 of the spring receiving member 12 are disposed on the same circle centered on the central axis of the insertion hole 121. On the other hand, the fitting holes 61 to 64 of the spring seat 20 are disposed to be shifted with respect to the central axis of the outer cylinder 17. Therefore, in the spring receiving member 12 in a state of being attached to the spring seat 20, the insertion hole 121 is eccentric with respect to the outer cylinder 17. Specifically, a position of the insertion hole 121 that is in phase with a center position of the notch part 124 in the circumferential direction is closest to the outer cylinder 17. A position of the insertion hole 121 that is 180° out of phase with the center position of the notch part 124 is farthest from the outer cylinder 17. In other words, a center position of the insertion hole 121 of the spring receiving member 12 is eccentric with respect to the outer cylinder 17 toward the reinforcing rib 22 side.

Also, in the spring receiving member 12 in a state of being attached to the spring seat 20, the spring receiving surface 125 of the suspension spring receiving part 122 is inclined in the cylinder radial direction passing through the central axis of the outer cylinder 17 and the center position between the pair of main brackets 18 in the cylinder circumferential direction. That is, in the cylinder radial direction, the spring receiving surface 125 is inclined to become further away from the bottom part 32 in the cylinder axial direction toward the outside in the direction in which the pair of main brackets 18 extend. The spring receiving surface 125 is inclined to approach the bottom part 32 in the cylinder axial direction outward in a direction opposite to the direction in which the pair of main brackets 18 extend.

The spring receiving member 12 in a state of being attached to the spring seat 20 accommodates a lower end of the suspension spring 6, which is a coil spring, inside the protruding wall part 123 in the radial direction. The spring receiving member 12 is in contact with the lower end of the suspension spring 6 and receives it on the spring receiving surface 125 of the suspension spring receiving part 122.

The inner member 13 is in contact with the bottom part 32 of the outer member 11. The inner member 13 includes a cylindrical inner tube 201 made of a metal and a body 202 made of a metal. The body 202 is fitted to the inner tube 201 to close one end of the inner tube 201 in the axial direction. The other end of the inner tube 201 on a side opposite to the body 202 is an opening 203. An outer circumferential portion of the body 202 has a stepped shape having a small-diameter portion and a large-diameter portion having a larger diameter than the small-diameter portion. An end portion of the inner tube 201 on a side opposite to the opening 203 is fitted to the small-diameter portion of the body 202.

The shock absorber 10 includes a closing member 211. The closing member 211 closes the opening 203 of the inner member 13 and the opening 35 of the outer member 11. The closing member 211 includes an annular rod guide 212 and an annular seal member 213. The rod guide 212 is fitted to both the side wall part 31 of the outer cylinder 17 and the inner tube 201. The seal member 213 is disposed on a side opposite to the bottom part 32 with respect to the rod guide 212. The seal member 213 is fitted to the side wall part 31 of the outer cylinder 17.

An outer circumferential portion of the rod guide 212 has a stepped shape having a small-diameter portion and a large-diameter portion having a larger diameter than the small-diameter portion. The body 202 of the inner member 13 is fitted inside the plurality of protruding parts 33 of the outer member 11 to be in contact with the bottom part 32. The small-diameter portion of the outer circumferential portion of the rod guide 212 is fitted into the opening 203 of the inner member 13. The large-diameter portion of the outer circumferential portion of the rod guide 212 is fitted to the opening side of the side wall part 31 of the outer member 11. Thereby, the inner member 13 is supported by the outer member 11 via the rod guide 212. In this state, the inner member 13 is disposed coaxially with the outer member 11 and positioned not to move in the radial direction.

The outer member 11 includes a swaged part 215 formed at an end portion of the side wall part 31 on a side opposite to the bottom part 32. The swaged part 215 has a cylindrical shape at the time of casting described above. The swaged part 215 is plastically deformed inward in the radial direction by curling processing at the time of assembly. The inner member 13 is in contact with the bottom part 32 of the outer member 11 at the body 202 thereof. Thereby, the rod guide 212 fitted into the inner member 13 is positioned in the axial direction with respect to the outer member 11. Then, the seal member 213 is sandwiched between the rod guide 212 positioned in the axial direction with respect to the outer member 11 and the swaged part 215 of the outer member 11. The seal member 213 seals the opening 35 side of the outer member 11.

The shock absorber 10 includes a piston 220 provided in the inner tube 201 of the inner member 13. The piston 220 is fitted in the inner tube 201 to be slidable. The piston 220 moves relative to the inner tube 201 in the axial direction. The piston 220 defines a first chamber 221 and a second chamber 222 in the inner member 13. The first chamber 221 is provided between the piston 220 and the rod guide 212 in the inner member 13. The second chamber 222 is provided between the piston 220 and the body 202 in the inner member 13. The second chamber 222 in the inner member 13 is divided from the reservoir chamber 14 by the body 202. The first chamber 221 and the second chamber 222 are filled with an oil fluid serving as a working liquid. The reservoir chamber 14 is filled with a gas serving as a working gas and the oil fluid serving as a working liquid.

The shock absorber 10 includes a hollow rod 231. One end side of the rod 231 in the axial direction is disposed in the inner tube 201 to be connected to the piston 220. The other end side of the rod 231 in the axial direction extends from the inner tube 201 and the outer cylinder 17 to the outside through the openings 203 and 35. The rod 231 moves relative to the inner tube 201 in the axial direction together with the piston 220. The rod 231 extends from the inner member 13 and the outer member 11 to the outside through the rod guide 212 and the seal member 213. Radial movement of the rod 231 is restricted by the rod guide 212. The rod 231 moves integrally with the piston 220 in the axial direction with respect to the inner member 13 and the outer member 11. The seal member 213 closes a space between the outer member 11 and the rod 231. Thereby, the seal member 213 restricts leakage of the working liquid in the inner member 13 and the working gas and the working liquid in the reservoir chamber 14 to the outside. As illustrated in FIG. 1, the rod 231 of the shock absorber 10 is connected to the vehicle body 5 side.

As illustrated in FIG. 4, a passage 241 and a passage (not illustrated) penetrating in the axial direction are formed in the piston 220. These passage 241 and passage (not illustrated) allow the first chamber 221 and the second chamber 222 to communicate with each other. The shock absorber 10 includes an annular disc valve 255 on a side of the piston 220 opposite to the bottom part 32 in the axial direction. The disc valve 255 can close the passage 241 by coming into contact with the piston 220. Also, the shock absorber 10 includes an annular disc valve 256 on the bottom part 32 side of the piston 220 in the axial direction. The disc valve 256 can close the passage (not illustrated) by coming into contact with the piston 220.

When the rod 231 moves to a compression side that increases an amount of entry into the inner tube 201 and the outer cylinder 17, the piston 220 moves in a direction in which the second chamber 222 is reduced. Then, when a pressure in the second chamber 222 becomes higher than a pressure in the first chamber 221 by a predetermined value or higher, the disc valve 255 opens the passage 241. At that time, the disc valve 255 generates a damping force. When the rod 231 moves to an extension side that increases an amount of protrusion from the inner tube 201 and the outer cylinder 17, the piston 220 moves in a direction in which the first chamber 221 is reduced. Then, when a pressure in the first chamber 221 becomes higher than a pressure in the second chamber 222 by a predetermined value or higher, the disc valve 256 opens the passage (not illustrated). At that time, the disc valve 256 generates a damping force. Therefore, the rod 231 and the piston 220 generate a damping force by moving relative to the inner tube 201 in the axial direction.

A passage 261 and a passage 262 penetrating in the axial direction are formed in the body 202 of the inner member 13. The passage 261 and the passage 262 allow the second chamber 222 and reservoir chamber 14 to communicate with each other. The shock absorber 10 includes an annular disc valve 275 and an annular disc valve 276. The disc valve 275 is positioned on the bottom part 32 side of the body 202 in the axial direction. The disc valve 275 can close the passage 261 by coming into contact with the body 202. The disc valve 276 is positioned on a side of the body 202 opposite to the bottom part 32 in the axial direction. The disc valve 276 can close the passage 262 by coming into contact with the body 202.

When the rod 231 moves to the compression side, the piston 220 moves in a direction in which the second chamber 222 is reduced. Then, when a pressure in the second chamber 222 becomes higher than a pressure in the reservoir chamber 14 by a predetermined value or higher, the disc valve 275 opens the passage 261. At that time, the disc valve 275 generates a damping force. When the rod 231 moves to the extension side, the piston 220 moves to the first chamber 221 side. Then, when a pressure in the second chamber 222 becomes lower than a pressure in the reservoir chamber 14, the disc valve 276 opens the passage 262. At that time, the disc valve 276 allows the working fluid to flow from the reservoir chamber 14 into the second chamber 222 without substantially generating a damping force. That is, the disc valve 276 serves as a suction valve.

Patent Document 1 described above describes a shock absorber having a configuration in which a fitting part is formed in a cylinder, a metal seat is fitted in the fitting part, and a resin seat is placed on the metal seat. Also, Patent Document 2 describes a shock absorber having a strut in which an inner portion made of a metal and an outer portion made of a composite material having a seat are integrally formed. Incidentally, there is a demand to suppress an increase in cost of a shock absorber. For example, in a case in which a spring seat is formed integrally with an outer cylinder by casting, when the spring seat is removed from a mold, the spring seat may not be smoothly removed from the mold unless an outer circumference of the spring seat is pushed by a mold release pin. In this case, there is a likelihood that galling will be generated on the spring seat by the mold, and this will cause a decrease in yield. However, since the spring seat is thin, it is difficult to push an outer circumference of the spring seat with a mold release pin. Therefore, it is necessary to release the mold with a larger number of mold release pins. In this case, there is a likelihood that maintenance costs for the mold release pins will increase, and this will cause an increase in running cost.

On the other hand, the shock absorber 10 of the first embodiment includes the bottomed cylindrical outer cylinder 17, the spring seat 20, and the mold release rib 25. The spring seat 20 is formed integrally with the outer cylinder 17. The spring seat 20 protrudes 17 in the radial direction of the outer cylinder 17 from the outer cylinder to support the suspension spring 6. The mold release rib 25 is formed integrally with the outer cylinder 17 and the spring seat 20. The mold release rib 25 connects the outer circumferential portion of the spring seat 20 and the outer cylinder 17. The mold release rib 25 includes the face part 81 provided at the outer end portion of the outer cylinder 17 in the radial direction. Therefore, even if the spring seat 20 is thin, the outer member 11 can be removed from the first mold 101 by pressing the face part 81 of the mold release rib 25 with the mold release pin 111. Therefore, even if the spring seat 20 is thin, the spring seat 20 can be smoothly removed from the first mold 101 by pressing the mold release rib 25 integrally adjacent to the spring seat 20 with the mold release pin 111. Here, the mark 85 is formed on the face part 81 of the mold release rib 25. This means that the outer member 11 is a member removed from the first mold 101 by pressing the face part 81 of the mold release rib 25 with the mold release pin 111.

Therefore, generation of galling on the spring seat 20 due to the first mold 101 can be suppressed, and a decrease in yield of the outer member 11 can be suppressed. Also, the number of mold release pins can be reduced. Therefore, maintenance costs for the mold release pins can be reduced, and running costs at the time of manufacturing the outer member 11 can be reduced. Moreover, a length of the mold release pin 111 can be made small. Therefore, breakage or the like of the mold release pin 111 can be suppressed. Also from this point, running costs at the time of manufacturing the outer member 11 can be reduced. Therefore, an increase in cost can be suppressed. In addition, since a rib necessary for reinforcing the spring seat 20 is used as the mold release rib 25, an increase in weight or the like can be suppressed.

Here, when the outer member 11 including a shape of the spring receiving member 12 is integrally molded, a portion that receives the suspension spring 6 is likely to have a casting defect such as a mold cavity, and there is a likelihood that sufficient strength reliability cannot be obtained. On the other hand, the shock absorber 10 has a structure in which a separate spring receiving member 12 formed of a resin material is placed on the spring seat 20 of the outer member 11 made of a metal. The spring receiving member 12 has the insertion hole 121 through which the outer cylinder 17 is inserted on the inner circumferential side. The spring receiving member 12 includes the suspension spring receiving part 122 for receiving the suspension spring 6 on the outer circumferential side. Therefore, the suspension spring 6 is received by the spring receiving member 12, and a strength of the portion receiving the suspension spring 6 can be secured.

The spring receiving member 12 makes the insertion hole 121 eccentric with respect to the outer cylinder 17. Thereby, a weight of the suspension spring receiving part 122 can be reduced compared to a case in which the insertion hole 121 is formed coaxially with the outer cylinder 17. That is, when the size of the suspension spring receiving part 122 is set to a size necessary for receiving the suspension spring 6, a weight of the spring receiving member 12 can be reduced.

Also, since the size of the insertion hole 121 can be increased, a water draining property through the insertion hole 121 can be improved.

The spring receiving member 12 includes the recesses 136 and 137 provided on the bottom surface 133 of the recessed part 132 serving as a facing surface facing the spring seat 20. The recesses 136 and 137 accommodate the parting lines 56 and 57. Therefore, the parting lines 56 and 57 can be utilized to stop rotation. Since the spring seat 20 is formed by the first mold 101 and the second mold 102 that are divided into two in the radial direction, two parting lines 56 and 57 are provided. On the other hand, if the spring seat 20 is formed by molds that are divided into three in the radial direction, three parting lines are provided. That is, the spring seat 20 includes at least two parting lines depending on how the mold is divided. The same number of recesses as the number of parting lines may be formed on the spring receiving member 12.

The face part 81 of the mold release rib 25 has a flat surface portion 82 that extends in the central axis direction of the outer cylinder 17. Therefore, the spring seat 20 can be more smoothly removed from the first mold 101 by pressing the inner side of the flat surface portion 82 with the mold release pin 111. In this case, at least a part of the mark 85 is formed in a range on the inner side of the flat surface portion 82.

Second Embodiment

Next, a second embodiment will be described mainly on the basis of FIG. 11, focusing on differences from the first embodiment. Also, parts common to those in the first embodiment will be denoted by the same terms and the same reference signs.

Figure 11:
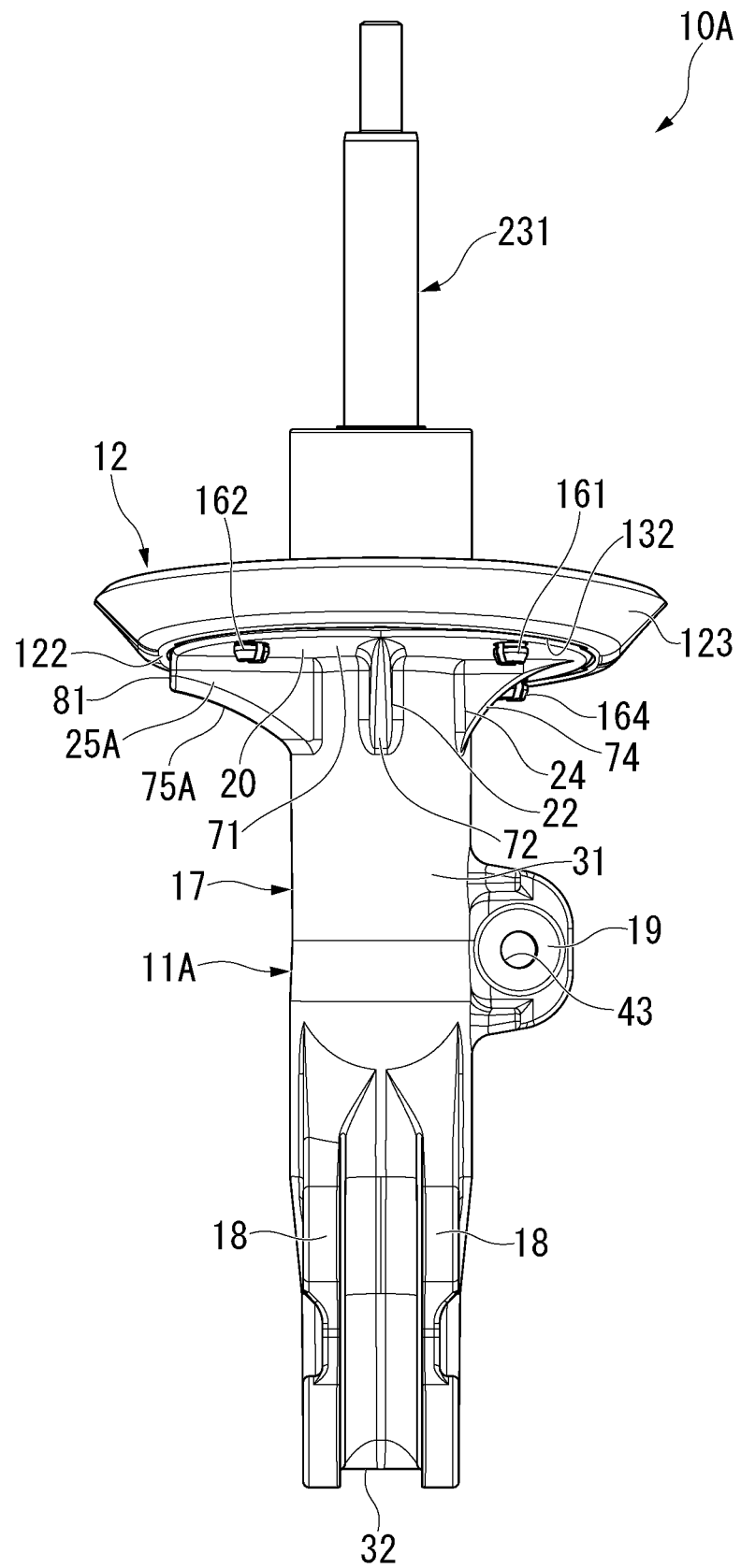
FIG. 11 is a side view illustrating a shock absorber according to a second embodiment of the present invention.

As illustrated in FIG. 11, in a shock absorber 10A of the second embodiment, an outer member 11A is used instead of the outer member 11 of the first embodiment. The outer member 11A includes a mold release rib 25A.

The mold release rib 25A is formed at the same position as the mold release rib 25 with respect to a spring seat 20. The mold release rib 25A protrudes from a base surface 71 so that an amount of protrusion from the base surface 71 increases toward an outer cylinder 17 in a radial direction of the spring seat 20. The mold release rib 25A has an outer end edge portion 75A facing a bottom part 32 side in a cylinder axial direction. The outer end edge portion 75A of the mold release rib 25A is not planar but arcuate. Then, the mold release rib 25A has an end portion at an end position on the outer cylinder 17 side and closest to the bottom part 32 side in the cylinder axial direction. The end portion of the mold release rib 25A is disposed at substantially the same position as end portions of reinforcing ribs 22 and 24 toward the same side. The mold release rib 25A also has a face part 81 similar to that of the mold release rib 25.

In the shock absorber 10A of the second embodiment, a connection portion of the mold release rib 25A to the outer cylinder 17 is longer than that of the mold release rib 25 in the cylinder axial direction. Therefore, the mold release rib 25A can reinforce the spring seat 20 with a higher strength than the mold release rib 25.

According to a first aspect of the present invention described above, a shock absorber is disposed between a vehicle body and an axle. The shock absorber includes a bottomed cylindrical cylinder, a spring seat, and a rib. The spring seat is formed integrally with the cylinder. The spring seat protrudes in a radial direction of the cylinder from the cylinder to support a suspension spring. The rib is formed integrally with the cylinder and the spring seat. The rib connects an outer circumferential portion of the spring seat and the cylinder. The rib has a face part provided at an outer end portion of the cylinder in the radial direction. Thereby, an increase in cost can be suppressed.

According to a second aspect, in the first aspect, a mark formed at the time of mold release is formed on the face part.

According to a third aspect, in the first or second aspect, a spring receiving member formed of a resin material is placed on the spring seat. The spring receiving member has an insertion hole through which the cylinder is inserted on an inner circumferential side. The spring receiving member includes a suspension spring receiving part that receives the suspension spring on an outer circumferential side.

According to a fourth aspect, in the third aspect, the insertion hole is eccentric with respect to the cylinder.

According to a fifth aspect, in the third or fourth aspect, the spring seat includes at least two parting lines. The spring receiving member includes recesses for accommodating the parting lines provided on a facing surface facing the spring seat.

According to a sixth aspect, in any one of the first to fifth aspects, the face part has a flat surface portion extending in a central axis direction of the cylinder.

INDUSTRIAL APPLICABILITY

According to the shock absorber described above, an increase in cost can be suppressed.

REFERENCE SIGNS LIST

3 Axle
5 Vehicle body
6 Suspension spring
10, 10A Shock absorber
12 Spring receiving member
17 Outer cylinder (cylinder)
20 Spring seat
25A Mold release rib (rib)
56, 57 Parting line
81 Face part
82 Flat surface portion
85 Mark
121 Insertion hole
122 Suspension spring receiving part
133 Bottom surface (facing surface)
136, 137 Recess

The invention claimed is:

1. A shock absorber, which is a shock absorber disposed between a vehicle body and an axle, comprising:
   a bottomed cylindrical cylinder;
   a spring seat formed integrally with the cylinder and protruding in a radial direction of the cylinder from the cylinder to support a suspension spring; and
   a rib formed integrally with the cylinder and the spring seat, connecting an outer circumferential portion of the spring seat and the cylinder, and having a face part provided at an outer end portion of the cylinder in the radial direction, wherein
   the spring seat includes at least two parting lines, and
   the face part includes a face extending parallel to the parting lines and parallel to an axial direction of the cylinder.

2. The shock absorber according to claim 1, wherein a mark formed at the time of mold release is formed on the face part.

3. The shock absorber according to claim 1, wherein a spring receiving member formed of a resin material, having an insertion hole through which the cylinder is inserted on an inner circumferential side, and having a suspension spring receiving part which receives the suspension spring on an outer circumferential side is placed on the spring seat.

4. The shock absorber according to claim 3, wherein the insertion hole is eccentric with respect to the cylinder.

5. The shock absorber according to claim 3, wherein
the spring receiving member includes recesses for accommodating the parting lines provided on a facing surface facing the spring seat.

6. The shock absorber according to claim 1, wherein the face part has a flat surface portion extending in a central axis direction of the cylinder.

* * * * *